(12) United States Patent
Winzell et al.

(10) Patent No.: US 11,205,250 B2
(45) Date of Patent: Dec. 21, 2021

(54) UPDATING A FIXED PATTERN NOISE MATRIX

(71) Applicant: Axis AB, Lund (SE)

(72) Inventors: Thomas Winzell, Lund (SE); Jesper Bengtsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/905,064

(22) Filed: Jun. 18, 2020

(65) Prior Publication Data

US 2020/0402212 A1 Dec. 24, 2020

(30) Foreign Application Priority Data

Jun. 18, 2019 (EP) .................................... 19180878

(51) Int. Cl.
*G06T 5/00* (2006.01)
*G06T 5/50* (2006.01)
*H04N 5/232* (2006.01)

(52) U.S. Cl.
CPC ............... *G06T 5/002* (2013.01); *G06T 5/50* (2013.01); *H04N 5/23229* (2013.01);
(Continued)

(58) Field of Classification Search
CPC . G06T 5/002; G06T 5/50; G06T 2207/10016; G06T 2207/10048;
(Continued)

(56) References Cited

U.S. PATENT DOCUMENTS

| | | | |
|---|---|---|---|
| 2004/0111220 A1* | 6/2004 | Ochs | G06K 9/624 702/19 |
| 2006/0071825 A1 | 4/2006 | Demos | |

(Continued)

FOREIGN PATENT DOCUMENTS

JP 2003-250093 A 9/2003

OTHER PUBLICATIONS

Sakoglu et al., "An Algebraic Restoration Method for Estimating Fixed-Pattern Noise in Infrared Imagery From Video Sequence"; Univ. of New Mexico Albuquerque, SPIE 2014 (Year: 2014).*

(Continued)

*Primary Examiner* — Dramos Kalapodas
(74) *Attorney, Agent, or Firm* — Volpe Koenig

(57) ABSTRACT

A method for updating a fixed pattern noise matrix comprises: calculating a first difference between a target and first different images in a video stream to obtain a first differential matrix; calculating a second difference between the target and second different images in the video stream to obtain a second differential matrix; identifying a set of candidate positions for fixed pattern noise by: locating first and second sets of positions in the first differential matrix at which a difference deviates from predetermined values, finding a set of overlapping positions between the first and second sets of positions, and adjusting the set of overlapping positions. The adjusted set of overlapping positions is used for fixed pattern noise. Furthermore, each position in the set of candidate positions is updated, wherein the updated fixed pattern noise value at each position is based on a value at a corresponding non-adjusted position in the differential matrix.

13 Claims, 5 Drawing Sheets

(52) U.S. Cl.
CPC ..... *H04N 5/23258* (2013.01); *H04N 5/23267* (2013.01); *G06T 2207/10016* (2013.01); *G06T 2207/10048* (2013.01)

(58) Field of Classification Search
CPC ........... H04N 5/23229; H04N 5/23258; H04N 5/23267; H04N 5/3656; H04N 5/365
See application file for complete search history.

(56) References Cited

U.S. PATENT DOCUMENTS

| | | | | |
|---|---|---|---|---|
| 2008/0144933 | A1* | 6/2008 | Or | G06T 7/32 382/173 |
| 2017/0372453 | A1 | 12/2017 | Foster | |
| 2017/0374304 | A1 | 12/2017 | Williams et al. | |
| 2018/0063454 | A1* | 3/2018 | Olsson | H04N 5/33 |
| 2018/0205898 | A1* | 7/2018 | Johansson | G06K 9/6202 |
| 2018/0365806 | A1* | 12/2018 | Saavedra Rubilar | H04N 5/365 |
| 2019/0253649 | A1* | 8/2019 | Okazaki | H04N 5/3658 |

OTHER PUBLICATIONS

Cain et al., "Projection-Based Image Registration in the Presence of Fixed-Pattern Noise" vol. 10 No. 12 Dec. 2001, IEEE (Year: 2001).*

Sakoglu et al., "An Algebraic Restoration Method for Estimatinf Fixed Pattern Noise in Infrared Imagery From Mvideo Sequence"; Proc.SPIE 2004 (Year: 2004).*

Sakoglu, et al., "An algebraic restoration method for estimating fixed-pattern noise in inftared imagery from a video sequence." Proc SPIE (2004).

Extended European Search Report dated Oct. 1, 2019 for the European Patent Application No. 19180878.1.

* cited by examiner

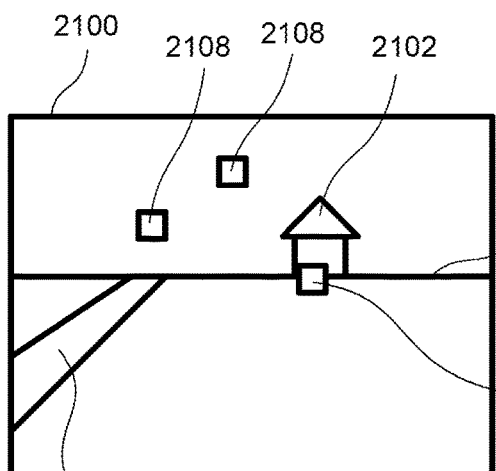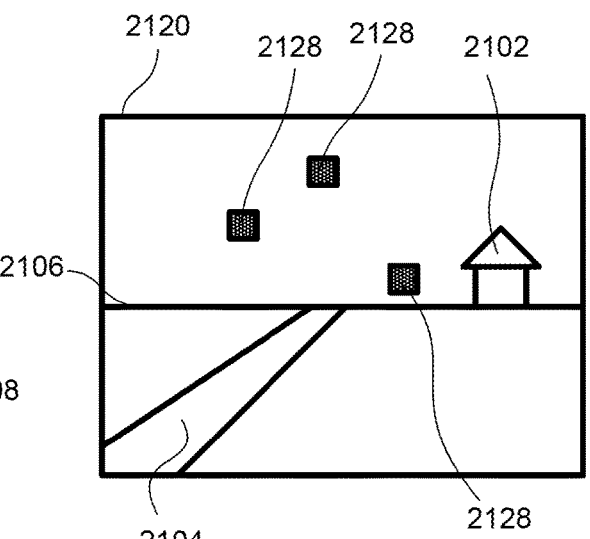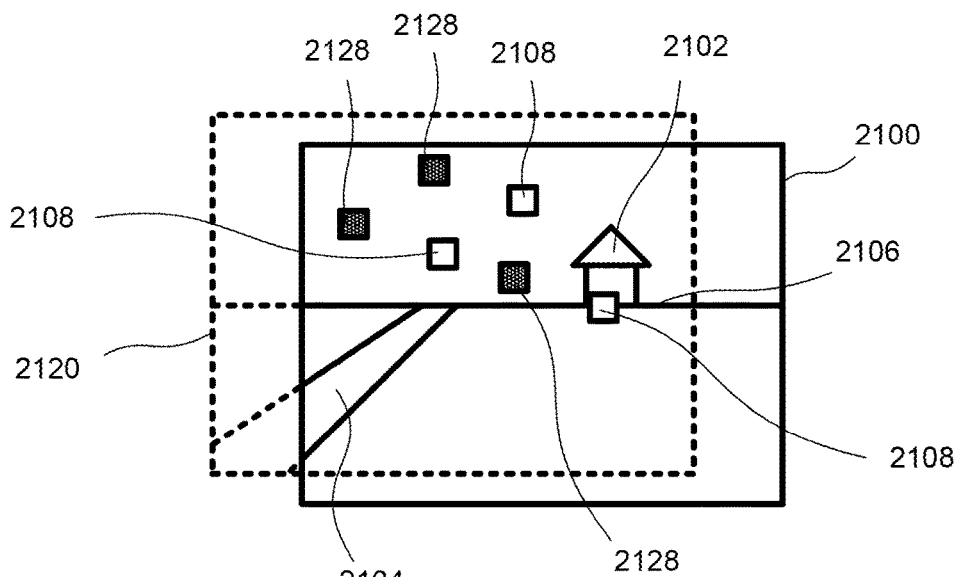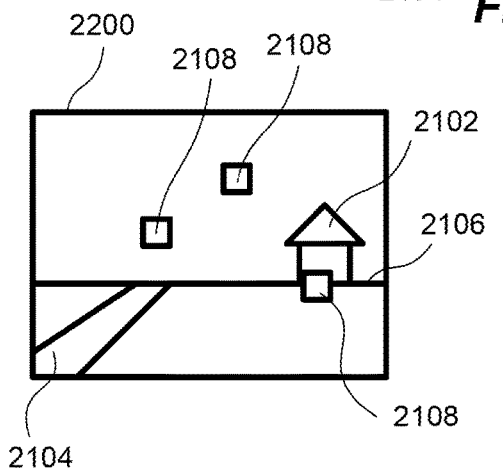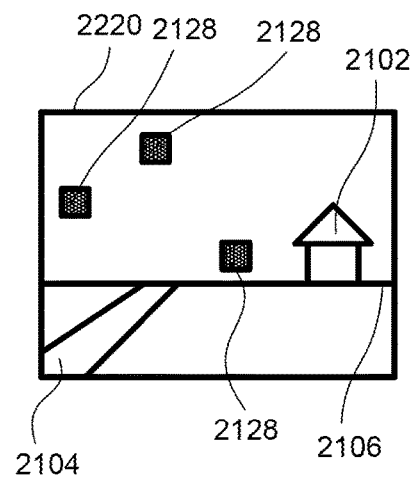

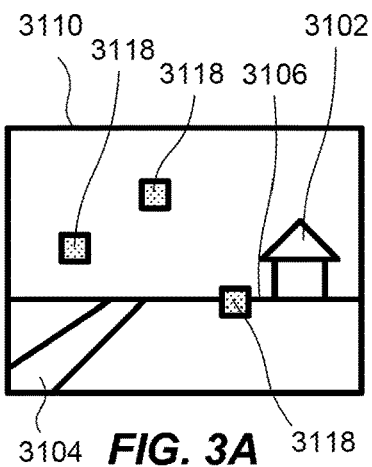 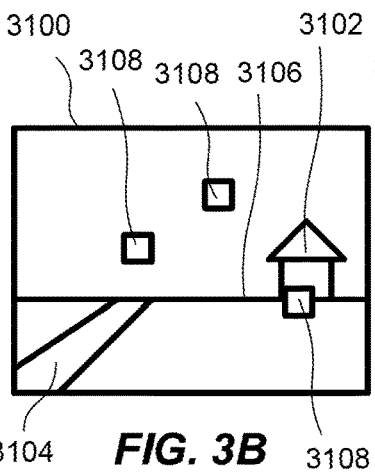 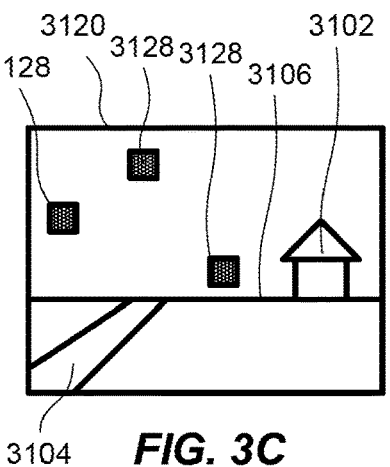
FIG. 3A  FIG. 3B  FIG. 3C
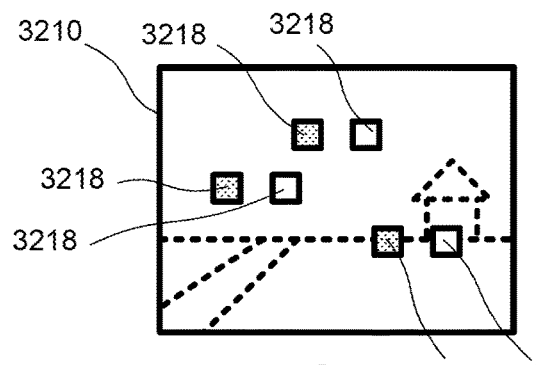 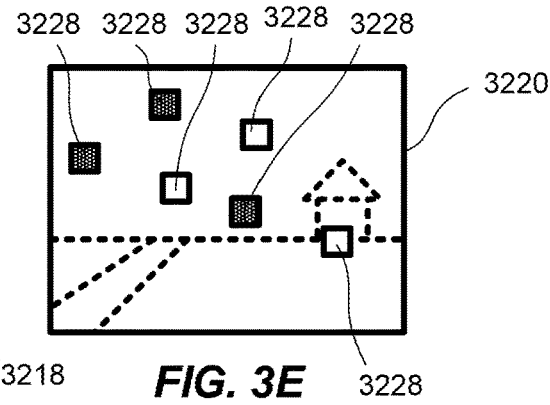
FIG. 3D  FIG. 3E
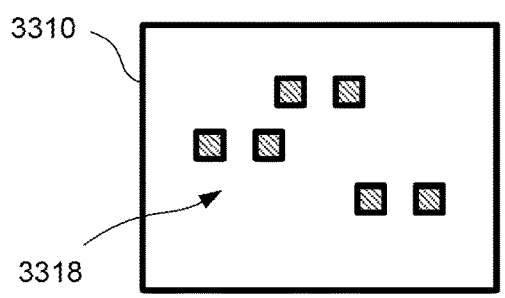 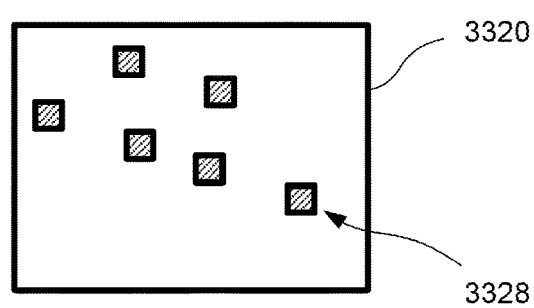
FIG. 3F  FIG. 3G
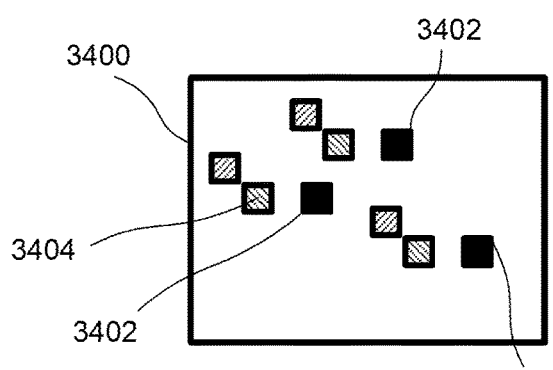 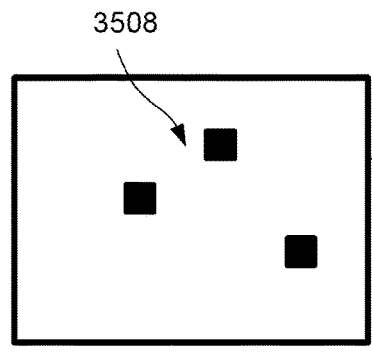
FIG. 3H  FIG. 3I

UPDATING A FIXED PATTERN NOISE MATRIX

TECHNICAL FIELD

The present invention relates to a method, and a camera for updating a fixed pattern noise matrix, and a method for processing image data.

BACKGROUND

In an image, different types of image noise are typically present that affects the image quality and hence influences any analytics performed on the image. Generally, the location of noise in the image can either be random or fixed. Due to its random nature, random noise can be reduced by, for example, averaging multiple images. Fixed noise, commonly referred to as fixed pattern noise, is a type of noise that varies between individual image sensors and can, for instance, be caused by variations related to the properties of each pixel in the image sensors or by variations in the readout circuitry, to name a few. Thus, the location of fixed pattern noise in an image is related to the position of the pixels in the image sensor itself. Therefore, reduction of fixed pattern noise by averaging images is not suitable, as the location of fixed pattern noise in each image is fixed, and such noise would therefore still be present in the averaged image.

A solution is to characterize each image sensor prior to deployment. However, even though the position of fixed pattern noise relative to the image sensor is fixed, the signal strength of the noise varies over time. Therefore, a calibration of the image sensor in order to remove fixed pattern noise is also not suitable.

Thus, there exists a need for an improved identification and reduction of fixed pattern noise in images.

SUMMARY

In view of the above, the present concept provides a method for updating a fixed pattern noise matrix, a method for processing image data, and a camera.

Mitigating, alleviating or eliminating one or more of the above-identified deficiencies in the art and disadvantages singly or in any combination and solve at least the above-mentioned problem would be beneficial.

According to a first aspect a method for updating a fixed pattern noise matrix is provided. The method comprises: calculating a first difference between pixel values of a target image in an electronic-image stabilized video stream and pixel values of a first different image in the electronic-image stabilized video stream, thereby obtaining a first differential matrix; calculating a second difference between pixel values of the target image in the electronic-image stabilized video stream and pixel values of a second different image in the electronic-image stabilized video stream, thereby obtaining a second differential matrix; identifying a set of candidate positions for fixed pattern noise in the fixed pattern noise matrix by: locating a first set of positions in the first differential matrix at which a difference of pixel values deviates from a predetermined value, locating a second set of positions in the second differential matrix at which a difference of pixel values deviates from the predetermined value, finding a set of overlapping positions between the first set of positions and the second set of positions, and adjusting the set of overlapping positions based on stabilization data of the target image, wherein the adjusted set of overlapping positions is used as the set of candidate positions for fixed pattern noise; and updating, for each position in the set of candidate positions in the fixed pattern noise matrix, a fixed pattern noise value at the position, wherein the updated fixed pattern noise value at each position in the set of candidate positions is based on a value at a corresponding non-adjusted position in the first and/or second differential matrix.

Within the context of this disclosure, "fixed pattern noise" should be construed as noise in an image having a fixed position relative to an image sensor used to capture the image. A signal strength/pixel value associated with fixed pattern noise may vary over time. However, the signal strength/pixel value associated with fixed pattern noise may vary slowly over time such that it is substantially constant during a time period. A duration of the time period may be related to the individual image sensor and a design of a readout circuitry of the image sensor. For example, in thermal equilibrium, the signal strength/pixel value associated with fixed pattern noise may be substantially constant for at least 5-10 minutes. Thus, the signal strength/pixel value associated with fixed pattern noise may be regarded as being substantially constant compared to a framerate (e.g. in a range from 1-100 FPS) of a video stream.

Within the context of this disclosure, "fixed pattern noise matrix" should be construed as a matrix comprising information relating to fixed pattern noise of the image sensor. The information relating to fixed pattern noise of the image sensor may comprise a value relating to a signal strength of the fixed pattern noise, and/or a value relating to a pixel value of the fixed pattern noise. Each element of the fixed pattern noise matrix may be associated with an individual pixel in the image sensor or a to group of pixels in the image sensor. For example, each element of the fixed pattern noise matrix may correspond to an individual pixel in the image sensor. A number of elements in a row/column of the fixed pattern noise matrix may be related to the number of pixels in a row/column of the image sensor.

Within the context of this disclosure, "a difference between pixel values of two images" should be construed as a difference between pixel values of pixels at corresponding positions in the two images. For example, in case the images are represented by matrices in which the elements are pixel values of respective image, the difference between pixel values of two images may be determined by matrix subtraction.

Within the context of this disclosure, "electronic-image stabilized video stream" should be construed as a video stream comprising individual images which have been processed such that effects in the video stream associated with image sensor vibrations are reduced. For example, an image sensor may capture a stream of primary images depicting a scene. Due to vibrations of the image sensor, the stream of primary images is affected, e.g., by blurring the depicted scene. An electronic-image stabilization algorithm may align each primary image in the stream of primary images based on stabilization data associated with each primary image, such that corresponding features in each of the primary images are aligned. The stabilization data may be supplied by a motion sensor (e.g., a gyroscope, an accelerometer and/or a three-axis compass). In other words, the electronic-image stabilization algorithm may align the primary images by moving each primary image an amount corresponding to the image sensor vibrations in order to counteract the effect of vibrations in the electronic-image stabilized video stream. Each primary image in the stream of aligned primary images may be cropped such that the stream of aligned primary images has a constant size, thereby the electronic-image stabilized video stream is formed. Thus, the primary images captured by the image sensor may have a higher pixel resolution than the images in the electronic-image stabilized video stream. By "pixel resolution", here is meant a number of pixels in a digital image. Typically, pixel resolution is given as a number of pixels in a first direction by a number of pixels in a second direction, where the second direction is perpendicular to the first direction.

Within the context of this disclosure, "a differential matrix" should be construed as a matrix comprising differences between pixel values of pixels at corresponding positions in the two images. Each element of the differential matrix may be associated with a difference between pixel values of corresponding pixels in the two images. For example, each element of the differential matrix may correspond to a difference between pixels values of corresponding pixels in the two images. A number of elements in a row/column of the differential matrix may be related to the number of pixels in a row/column of the images. A differential matrix may be determined by matrix subtraction.

Within the context of this disclosure, "a position of an element in a matrix" should be construed as an address of the element in the matrix. The address of the element may be the column and the row of the matrix associated with the element.

Within the context of this disclosure, "a candidate position for fixed pattern noise" should be construed as a position in the fixed pattern noise matrix at which fixed pattern noise may be present in the corresponding pixel of the image sensor.

By means of the present method, identification of pixels in the image sensor possibly affected by fixed pattern noise is allowed. Repeating the present method for a different target image in the electronic-image stabilized video stream, thereby further updating the fixed pattern noise matrix, allows for an even further improved identification of pixels in the image sensor possibly affected by fixed pattern noise. Fixed pattern noise in the images of the electronic-image stabilized video stream may thereby be reduced by subtracting the fixed pattern noise values of the fixed pattern noise matrix from pixel values of corresponding pixels of the images of the electronic-image stabilized video stream. An electronic-image stabilized video stream with reduced fixed pattern noise may thereby be formed.

The updated fixed pattern noise value at each candidate position may in addition be based on a present fixed pattern noise value at the candidate position in the fixed pattern noise matrix.

A more accurate method for determining an updated fixed pattern noise value may be allowed. The updated fixed pattern noise value may be a weighted sum of the present fixed pattern noise value and the value at the corresponding non-adjusted position in the first and/or second differential matrix. Thus, in case the present method is repeated for a plurality of target images in the electronic-image stabilized video stream, a candidate position for fixed pattern noise in the fixed pattern noise matrix which is an actual position for fixed pattern noise may have a higher fixed pattern noise value than a candidate position for fixed pattern noise which is not an actual position for fixed pattern noise.

The contribution to the updated fixed pattern noise value from the present fixed pattern noise value may be scaled by a blend factor between 0 and 100%, and the contribution to the updated fixed pattern noise value from the value at the corresponding non-adjusted position in the first and/or second differential matrix may be scaled by a difference between 100% and the blend factor.

The fixed pattern noise value may be increased or reduced compared to the present fixed pattern noise value depending on the value at the corresponding non-adjusted position in the first and/or second differential matrix.

Repeating the present method for a plurality of target images, the fixed pattern noise values at candidate positions in the fixed pattern noise matrix may, over time, approach pixel values or signal strengths at corresponding positions in the plurality of target images. Thus, an improved method for determining fixed pattern noise values and/or updating the fixed pattern noise matrix may be achieved, thereby allowing for an improved reduction of fixed pattern noise present in the electronic-image stabilized video stream.

The method may further comprise: updating, for each position not being part of the set of candidate positions in the fixed pattern noise matrix, a fixed pattern noise value at the position, wherein the updated fixed pattern noise value at each position not being part of the set of candidate positions is based on a present fixed pattern noise value scaled by the blend factor.

In other words, the fixed pattern noise value at a position not being part of the set of candidate positions may be reduced (by scaling by the blend factor) compared to the present fixed pattern noise value.

Fixed pattern noise values at positions which are not actual positions for fixed pattern noise may be reduced.

Additionally, any fixed pattern noise values at positions not being part of the set of candidate positions that during a previous iteration of the present method were identified as candidate positions for fixed pattern noise (i.e. positions being part of a previous set of candidate positions in the fixed pattern noise matrix) may be reduced.

According to a second aspect a method for processing image data is provided. The method comprises: updating a fixed pattern noise matrix by the method according to the first aspect; reducing fixed pattern noise from the image data by subtracting the fixed pattern noise values of the fixed pattern noise matrix from pixel values of the image data.

The above-mentioned features of the method for updating a fixed pattern noise matrix, when applicable, apply to this second aspect as well. In order to avoid undue repetition, reference is made to the above.

Additionally, by reducing fixed pattern noise in the image data, analyses (e.g. object detection, face recognition, etc.) performed on the image data may be improved.

The method for processing image data may further comprise: forming an image based on the processed image data.

An image quality of the formed image may be improved by reducing fixed pattern noise.

Performing the method according to the second aspect for a plurality of target images may allow for forming an electronic-image stabilized video stream based on the plurality of processed target images. An electronic-image stabilized video stream having improved image quality by reducing fixed pattern noise may thereby be allowed.

According to a third aspect a non-transitory computer-readable storage medium having stored thereon instructions for implementing the method according to the first aspect and/or the second aspect, when executed on a device having processing capabilities is provided.

The above-mentioned features of the method for updating a fixed pattern noise matrix and the method for processing image data, when applicable, apply to this third aspect as well. In order to avoid undue repetition, reference is made to the above.

According to a fourth aspect a camera is provided. The camera comprises: an image sensor configured to capture a video stream; a motion sensor; and a processor configured to: electronically image stabilize the captured video stream based on data received from the motion sensor, and update a fixed pattern noise matrix using the method according to the first aspect and/or the second aspect.

The above-mentioned features of the method for updating a fixed pattern noise matrix, the method for processing image data, and the non-transitory computer-readable storage medium, when applicable, apply to this fourth aspect as well. In order to avoid undue repetition, reference is made to the above.

The motion sensor may comprise a gyroscope, an accelerometer, and/or a three-axis compass.

The processor may be further configured to: reduce fixed pattern noise from image data associated with the electronically image stabilized video stream by subtracting the fixed pattern noise values of the fixed pattern noise matrix from pixel values of the image data.

The processor may be further configured to: form a processed image based on the image data having reduced fixed pattern noise.

An associated advantage is that an electronic-image stabilized video stream having reduced fixed pattern noise may be allowed.

The camera may further comprise: a non-transitory computer-readable storage medium configured to store the fixed pattern noise matrix.

The camera may be a thermal camera.

A further scope of applicability of the present disclosure will become apparent from the detailed description given below. However, it should be understood that the detailed description and specific examples, while indicating preferred variants of the present concepts, are given by way of illustration only, since various changes and modifications within the scope of the concepts will become apparent to those skilled in the art from this detailed description.

Hence, it is to be understood that this present concepts are not limited to the particular steps of the methods described or component parts of the systems described as such method and system may vary. It is also to be understood that the terminology used herein is for purpose of describing particular variants only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present concept will now be described in more detail, with reference to the appended drawings showing variants of the concept. The figures should not be considered limiting the concept to the specific variant; instead they are used for explaining and understanding the concept.

As illustrated in the figures, the sizes of layers and regions are exaggerated for illustrative purposes and, thus, are provided to illustrate the general structures of variants of the present concept. Like reference numerals refer to like elements throughout.

FIG. 2A illustrates a first primary image.
FIG. 2B illustrates a second primary image.
FIG. 2C illustrates a shift between the first primary image and the second primary image.
FIG. 2D illustrates an electronic-image stabilized version of the first primary image.
FIG. 2E illustrates an electronic-image stabilized version of the second primary image.
FIG. 3A illustrates a first different image in an electronic-image stabilized video stream.
FIG. 3B illustrates a target image in an electronic-image stabilized video stream.
FIG. 3C illustrates a second different image in an electronic-image stabilized video stream.
FIG. 3D illustrates a graphical representation of a first differential matrix.
FIG. 3E is a graphical representation of a second differential matrix.
FIG. 3F is a graphical representation of a first set of positions in the first differential matrix.
FIG. 3G is a graphical representation of a second set of positions in the second differential matrix.
FIG. 3H is a graphical representation of an overlay of the first and second sets of positions.
FIG. 3I is a graphical representation of a set of overlapping positions.

DETAILED DESCRIPTION

The present concept will now be described more fully hereinafter with reference to the accompanying drawings, in which currently preferred variants of the concept are shown. This concept may, however, be implemented in many different forms and should not be construed as limited to the variants set forth herein; rather, these variants are provided for thoroughness and completeness, and fully convey the scope of the present concept to the skilled person.

Figure 1:
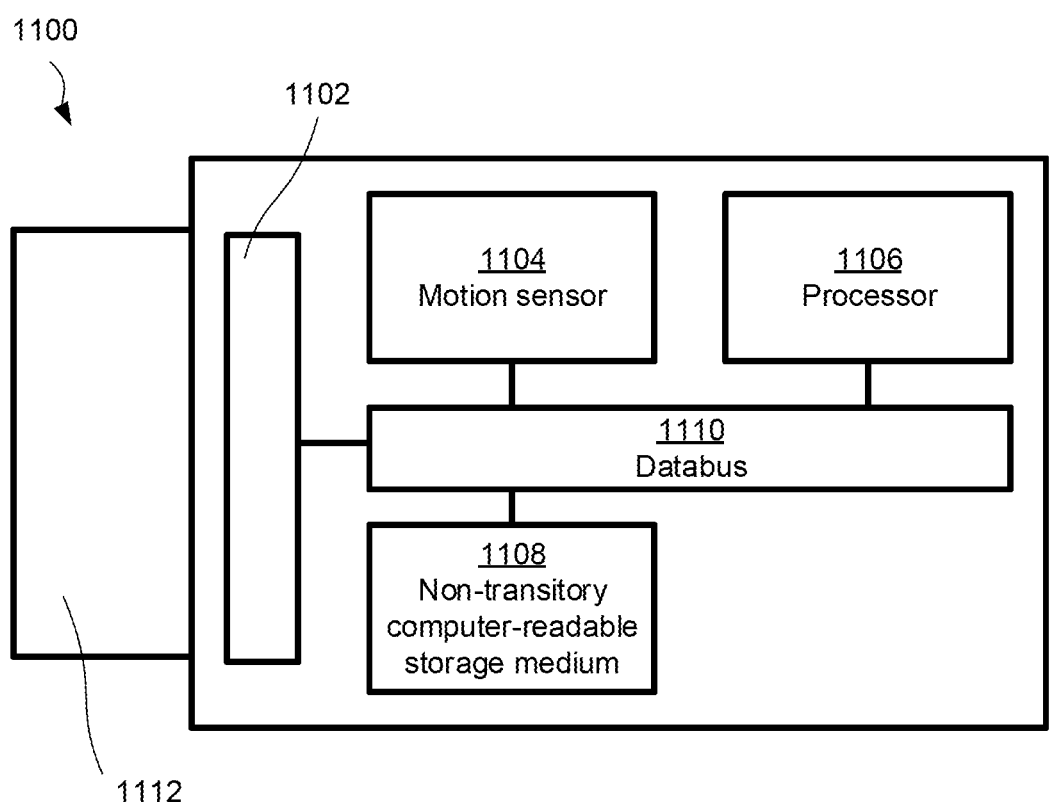
FIG. 1 illustrates a camera.

FIG. 1 illustrates a camera 1100. The camera 1100 comprises an image sensor 1102 configured to capture a video stream. The camera 1100 may be a thermal camera. The image sensor 1102 may be sensitive to infrared light.

The camera 1100 further comprises a motion sensor 1104. The motion sensor 1104 may comprise a gyroscope, an accelerometer, and/or a three-axis compass. The motion sensor 1104 may determine data related to a vibration and or a movement of the image sensor 1102.

The camera 1100 further comprises a processor 1106. The processor 1106 is configured to electronically image stabilize the captured video stream based on data received from the motion sensor 1104. The processor 1106 is further configured to update a fixed pattern noise matrix. The processor 1106 may be configured to perform the one or more of the methods described in relation to FIG. 3, FIG. 4, and FIG. 5 to update the fixed pattern noise matrix. It is to be understood that parts of the method may be implemented as a hardware circuit comprised in the camera 1100 in addition to, or instead of, being performed by the processor 1106.

The processor 1106 may be further configured to reduce fixed pattern noise from image data associated with the electronically image stabilized video stream by subtracting the fixed pattern noise values of the fixed pattern noise matrix from pixel values of the image data.

The processor 1106 may be further configured to form a processed image based on the image data having reduced fixed pattern noise. Thus, the processor 1106 may further be configured to form a processed electronic-image stabilized video stream having reduced fixed pattern noise.

The camera 1100 may further comprise a non-transitory computer-readable storage medium 1108 configured to store the fixed pattern noise matrix. The non-transitory storage medium 1108 may be further configured to store the electronic image stabilized video stream. The image sensor 1102, the gyroscope 1104, the processor 1106, and the non-transitory storage medium 1108 may communicate via a data bus 1110. The camera 1100 may further comprise optics 1112. The optics 1112 may be imaging optics, e.g., a camera objective, arranged to image a scene onto the image sensor 1102.

An effect of electronic-image stabilization of a video stream comprising fixed pattern noise will now be described with reference to FIG. 2A-E. It is to be noted that a size of fixed pattern noise shown in FIG. 2A-E is exaggerated in order to increase its visibility the shown examples. Fixed pattern noise typically has a size similar to individual pixels. FIG. 2A illustrates a first primary image 2100 and FIG. 2B illustrates a second primary image 2120. The first primary image 2100 and the second primary image 2120 depict a scene comprising features, e.g. a house 2102, a road 2104, and a horizon 2106. Due to vibrations/movements of an image sensor 1102 used to capture the first primary image 2100 and second primary image 2120, the features 2102, 2104, 2106 of the depicted scene are translated within the image between the first primary image 2100 and the second primary image 2120, as can be seen upon a comparison of FIG. 2A and FIG. 2B. In the first primary image 2100 and the second primary image 2120, fixed pattern noise 2108, 2128 is present. As is seen upon a comparison of FIG. 2A and FIG. 2B, positions of fixed pattern noise 2108, 2128 within each image 2100, 2120 is essentially constant, as the position of fixed pattern noise within an image is relative to the image sensor 1102. In FIG. 2A and FIG. 2B, the fixed pattern noise 2108, 2128 is shown as squares having different patterns. This is done in order to easier distinguish fixed pattern noise 2108 from the first primary image 2100 from fixed pattern noise 2128 from the second primary image 2108 in the FIG. 2C.

An electronic-image stabilization algorithm shifts the primary images 2100, 2120 to counteract the movement of the image sensor 1102 between the first primary image 2100 and the second primary image 2120, as exemplified in FIG. 2C. In FIG. 2C, the second primary image 2120 is shown with dashed lines in order to make it easier to distinguish the second primary image 2120 from the first primary image 2100. A size of the shift performed by the electronic-image stabilization algorithm is based on data received from a motion sensor 1104. The motion sensor 1104 may comprise a gyroscope, an accelerometer, and/or a three-axis compass. Data related to the motion sensor 1104 may be integrated over time in order to determine a size of the movement of the image sensor 1102 between the first primary image 2100 and the second primary image 2120. As is seen in FIG. 2C, after shifting the first primary image 2100 and the second primary image 2120, the features 2102, 2104, 2106 of the depicted scene are aligned.

Subsequent to the shifting, the shifted first and second primary images 2100, 2120 are cropped as exemplified in FIG. 2D and FIG. 2E, respectively. An electronic-image stabilized video stream may thereby be formed from the cropped images. The first primary image 2100 and the second primary image 2120 are cropped such that a horizontal and vertical size of the electronic-image stabilized video stream is constant. As is seen upon a comparison of FIG. 2D and FIG. 2E, a position of fixed pattern noise in the first image of the electronic-image stabilized video stream is different than a position of fixed pattern noise in the second image of the electronic-image stabilized video stream, which is an effect of the shifting of the primary images 2100, 2120 to counteract vibrations/movements of the image sensor 1102. Thus, between the primary images, positions of fixed pattern noise are substantially constant, while features of the depicted scene move due to image sensor vibrations/movements, and in images of the electronic-image stabilized video stream, features of the depicted scene remain substantially constant while positions of fixed pattern noise move. Therefore, in an electronic-image stabilized video stream, fixed pattern noise is visible as it moves (i.e. shifts positions) within the image between individual images in the video stream. This effect may reduce a visual quality of the electronic-image stabilized video stream and it may further negatively affect any analyses (e.g. object detection, face recognition, etc.) performed on the electronic-image stabilized video stream.

A method for updating a fixed pattern noise matrix will now be described with reference to FIG. 3A-3I.

FIG. 3A-C illustrates images 3100, 3110, 3120 from an electronic-image stabilized video stream. It is to be noted that a size of fixed pattern noise shown in FIG. 3A-I is exaggerated in order to increase its visibility in the shown examples. Fixed pattern noise typically has a size similar to individual pixels. The electronic-image stabilized video stream comprises a target image 3100, a first different image 3110, and a second different image 3120. The target image 3100 may be subsequent to the first different image 3110 in the electronic-image stabilized video stream. The target image 3100 may be antecedent to the second different image 3120 in the electronic-image stabilized video stream. It is to be understood that the specific order of the target image 3100, the first different image 3110, and the second different image 3120 in the electronic-image stabilized video stream may be different. For instance, the target image 3100 may be subsequent or antecedent to the first different image 3110 and the second different image 3120.

As is seen in FIG. 3A-3C, features of a depicted scene (e.g. the house 3102, the road 3104, and the horizon 3106) remain substantially stationary between images 3100, 3110, 3120 in the electronic-image stabilized video stream. However, fixed pattern noise 3108, 3118, 3128 shift between the target image 3100, the first different image 3110, and the second different image 3120 in the electronic-image stabilized video stream. This is an effect of the fixed pattern noise 3108, 3118, 3128 being substantially stationary relative to an image sensor 1102 used to capture images in the electronic-image stabilized video stream. Therefore, electronic-image stabilizing a video stream in which the depicted scene is moving (e.g. due to camera shaking) will result in the fixed pattern noise shifting positions between the images 3100, 3110, 3120 of the electronic-image stabilized video stream. Pixel values in the images 3100, 3110, 3120 associated with the fixed pattern noise 3108, 3118, 3128 may be substantially constant between images 3100, 3110, 3120 in the electronic-image stabilized video stream.

In order to reduce fixed pattern noise 3108, 3118, 3128 in the electronic-image stabilized video stream according to the present concept, a fixed pattern noise matrix is created and updated. The fixed pattern noise matrix comprises positions and values corresponding to fixed pattern noise in the electronic-image stabilized video stream. The fixed pattern noise matrix may have dimensions corresponding to a pixel resolution of an image sensor 1102 used to capture images of the electronic-image stabilized video stream. The captured images of the electronic-image stabilized video stream may be cropped. In other words, the pixel resolution of the image sensor 1102 used to capture the images in the electronic-image stabilized video stream may be larger than a pixel resolution of the images in the electronic-image stabilized video stream.

A first difference between pixel values of the target image 3100 in an electronic-image stabilized video stream and pixel values of the first different image 3110 in the electronic-image stabilized video stream is calculated, thereby obtaining a first differential matrix. A graphical representation 3210 of the first differential matrix is shown in FIG. 3D. The first difference may be calculated by subtracting the pixel values of the first different image 3110 from the pixel values of the target image 3100. Alternatively, the first difference may be calculated by subtracting the pixel values of the target image 3100 from the pixel values of the first different image 3110. As is seen in the graphical representation 3210 of the first differential matrix, differences between pixel values associated with stationary features (e.g. the house 3102, the road 3104, and the horizon 3106) in the depicted scene are small, or even zero, in the first differential matrix. Differences 3218 related to the fixed pattern noise, however, are present in the first differential matrix 3210. The first differential matrix may have dimensions corresponding to a pixel resolution of the target image 3100, and/or the first different image 3110. In other words, an element in the first differential matrix may be a difference between pixel values at corresponding positions in the target image 3100 and the first different image 3110.

A second difference between pixel values of the target image 3100 in the electronic-image stabilized video stream and pixel values of a second different image 3120 in the electronic-image stabilized video stream is calculated, thereby obtaining a second differential matrix. A graphical representation 3220 of the second differential matrix is shown in FIG. 3E. The second difference may be calculated by subtracting the pixel values of the target image 3100 from the pixel values of the second different image 3120. Alternatively, the second difference may be calculated by subtracting the pixel values of the second different image 3120 from the pixel values of the target image 3100. As is seen in the graphical representation 3220 of the second differential matrix, differences between pixel values associated with stationary features (e.g. the house 3102, the road 3104, and the horizon 3106) in the depicted scene are small, or even zero, in the second differential matrix. Differences 3228 related to the fixed pattern noise, however, are present in the second differential matrix 3210. The second differential matrix may have dimensions corresponding to a pixel resolution of the target image 3100, and/or the second different image 3120. In other words, an element in the second differential matrix may be a difference between pixel values at corresponding positions in the second different image 3120 and the target image 3100.

A set of candidate positions for fixed pattern noise in the fixed pattern noise matrix is identified by locating a first set of positions 3318 in the first differential matrix at which a difference of pixel values deviates from a predetermined value. The predetermined value may be a threshold value. The predetermined value may be zero. A graphical representation 3310 of the first set of positions 3318 in the first differential matrix is shown in FIG. 3F. In the graphical representation 3310 of the first set of positions, positions of differences of pixel values smaller than the threshold value (e.g. differences of pixel values associated with the house 3102, the road 3104, and the horizon 3106) are not included in the first set of positions 3318 in the first differential matrix.

The set of candidate positions for fixed pattern noise in the fixed pattern noise matrix is further identified by locating a second set of positions 3328 in the second differential matrix at which a difference of pixel values deviates from the predetermined value. A graphical representation 3320 of the second set of positions 3328 in the second differential matrix is shown in FIG. 3G. In the graphical representation 3320 of the first set of positions, positions of differences of pixel values smaller than the threshold value (e.g. differences of pixel values associated with the house 3102, the road 3104, and the horizon 3106) are not included in the second set of positions 3328 in the second differential matrix.

The set of candidate positions for fixed pattern noise in the fixed pattern noise matrix is further identified by finding a set of overlapping positions between the first set of positions 3318 and the second set of positions 3328. A graphical representation 3400 of an overlap of the first set of positions 3318 and the second set of positions 3328 is illustrated in FIG. 3H. As is seen in FIG. 3H, there are overlapping 3402 and non-overlapping 3404 positions. In order to increase the readability of the FIG. 3H, only one non-overlapping position is explicitly referenced. However, a skilled person realizes that there is a plurality of non-overlapping positions in the graphical representation 3400 of the overlap of the first set of positions 3318 and the second set of positions 3328. The set of overlapping positions is found by neglecting the non-overlapping positions 3404 between the first set of positions 3318 and the second set of positions 3328. A graphical representation 3500 of the set of overlapping positions 3508 is illustrated in FIG. 1I.

In case the pixel values of the target image 3100 are minuends/subtrahends when calculating both the first differential matrix and the second differential matrix, an overlapping position may be found by, upon comparing the values at positions in the first and second differential matrix corresponding to the first and second sets of positions 3318, 3328, finding that moduli of the corresponding values are similar and signs of values at corresponding positions are the same. In case the pixel values of the target image 3100 are subtrahends when calculating one of the first differential matrix and the second differential matrix, and minuends when calculating the other, an overlapping position may be found by, upon comparing the values at positions in the first and second differential matrix corresponding to the first and second sets of positions 3318, 3328, finding that moduli of the corresponding values are similar and signs of values at corresponding positions are different. Thus, the set of overlapping positions 3508 may be found by comparing the moduli and signs of values in the first and second differential matrix at positions corresponding to the first and second sets of positions 3318, 3328. Whether the moduli of corresponding values are similar may depend on a signal-to-noise ratio. The moduli of corresponding values may be similar in case they are within ±10% of each other.

The set of overlapping positions 3508 may further be found by calculating, for each position in the first and second sets of positions, the difference between absolute values of non-zero values at corresponding positions in the first and second sets of positions 3318, 3328, and, upon comparing the difference with a threshold value, finding that the difference is smaller than the threshold value. The threshold value may be based on a noise level in the target image 3100.

The set of candidate positions for fixed pattern noise in the fixed pattern noise matrix is further identified by adjusting the set of overlapping positions based on stabilization data of the target image 3100, wherein the adjusted set of overlapping positions is used as the set of candidate positions for fixed pattern noise. Each position in the set of overlapping positions relates to the target image 3100. By adjusting the set of overlapping positions based on stabilization data of the target image 3100, each position in the set of overlapping positions may be adjusted such that it relates to the fixed pattern noise matrix, thereby allowing the use of the adjusted set of overlapping positions as the set of candidate positions for fixed pattern noise. Thus, each position in the set of overlapping positions may be adjusted such that it relates to the image sensor 1102 used to capture images 3100, 3110, 3120 in the electronic-image stabilized video stream. The stabilization data of the target image 3100 may be determined by a motion sensor 1104 (e.g. a gyroscope, an accelerometer, and/or a three-axis compass).

For each position in the set of candidate positions in the fixed pattern noise matrix, a fixed pattern noise value at the position is updated, wherein the updated fixed pattern noise value at each position in the set of candidate positions is based on a value at a corresponding non-adjusted position in the first and/or second differential matrix. The updated fixed pattern noise value may be increased, decreased, or held constant based on the value at the corresponding non-adjusted position in the first and/or second differential matrix. It is to be understood that a sign of the value at the corresponding non-adjusted position in the first/second differential matrix is dependent on how the first/second differential matrix is calculated. Thus, how the first and/or second differential matrix is calculated may determine if the updated fixed pattern noise value should be increased or decreased based on the value at the corresponding non-adjusted position in the first and/or second differential matrix. In other words, the updated fixed pattern noise value may be further based on how the first and/or second differential matrix is calculated.

The updated fixed pattern noise value at each candidate position in addition may be based on a present fixed pattern noise value at the candidate position in the fixed pattern noise matrix. In other words, the present fixed pattern noise value at the candidate position may be updated based on the value at the corresponding non-adjusted position in the first and/or second differential matrix.

For example, consider the specific example where the first differential matrix is calculated by subtracting pixel values of the first different image from pixel values of the target image 3100, and the second differential matrix is calculated by subtracting pixel values of the target image 3100 from pixel values of the second different image. In this specific example, for a position in the target image 3100 comprising positive fixed pattern noise, the value at the corresponding position in the first differential matrix may be positive, and the value at the corresponding position in the second differential matrix may be negative. Thus, in case the updated fixed pattern noise value is based on the value at the corresponding non-adjusted position in the second differential matrix, the sign of the value at the corresponding non-adjusted position may be reversed during updating in this specific example. This may, for example, be implemented by subtracting the value at the corresponding non-adjusted position in the second differential matrix from the present fixed pattern noise value at the candidate position in the fixed pattern noise matrix. Also, in case the updated fixed pattern noise value is based on the value at the corresponding non-adjusted position in the first differential matrix, the sign of the value at the corresponding non-adjusted position may not be reversed during updating in this specific example. This may, for example, be implemented by adding the value at the corresponding non-adjusted position in the second differential matrix to the present fixed pattern noise value at the candidate position in the fixed pattern noise matrix.

From the above example, a skilled person realizes how the calculation of the first and second differential matrix affects the values of the first and second differential matrix and how the related implementation of updating the fixed pattern noise value at the candidate position is adjusted accordingly.

The contribution to the updated fixed pattern noise value from the present fixed pattern noise value may be scaled by a blend factor between 0 and 100%, and the contribution to the updated fixed pattern noise value from the value at the corresponding non-adjusted position in the first and/or second differential matrix may be scaled by a difference between 100% and the blend factor. Thus, the value of the blend factor may affect how quickly the fixed pattern noise values at candidate positions in the fixed pattern noise matrix approach pixel values or signal strengths at corresponding positions in the target image 3100 when updating the fixed pattern noise matrix for a plurality of different target images. It may be advantageous to choose the blend factor such that the updated fixed pattern noise values for candidate positions in the fixed pattern noise matrix approach the corresponding pixel values in the target image 3100 slowly (e.g. using a blend factor less than 50%) in case there is an object moving through the depicted scene. In such case, the corresponding pixel values in the target image 3100 may not relate to fixed pattern noise.

For each position not being part of the set of candidate positions in the fixed pattern noise matrix, a fixed pattern noise value at the position may be updated, and the updated fixed pattern noise value at each position not being part of the set of candidate positions may be based on a present fixed pattern noise value scaled by the blend factor. Since the blend factor is smaller than 100%, the updated fixed pattern noise value at each position not being part of the set of candidate positions may be reduced compared to the present fixed pattern noise value at that position. The blend factor may thereby affect how quickly the updated fixed pattern noise value at each position not being part of the set of candidate positions may approach 0 when updating the fixed pattern noise matrix for a plurality of different target images. This may be advantageous in case, in a previous target image of the electronic-image stabilized video stream, a candidate position was identified that did not correspond to actual fixed pattern noise and the corresponding updated fixed pattern noise value was increased. This may happen in case there is an object moving through the depicted scene, as described previously. Updating the fixed pattern noise matrix for subsequent target images in the electronic-image stabilized video stream, may thereby reduce fixed pattern noise values at positions not being part of candidate positions for fixed pattern noise that, for a previous target image in the electronic-image stabilized video stream, were identified as candidate positions for fixed pattern noise.

Figure 4:
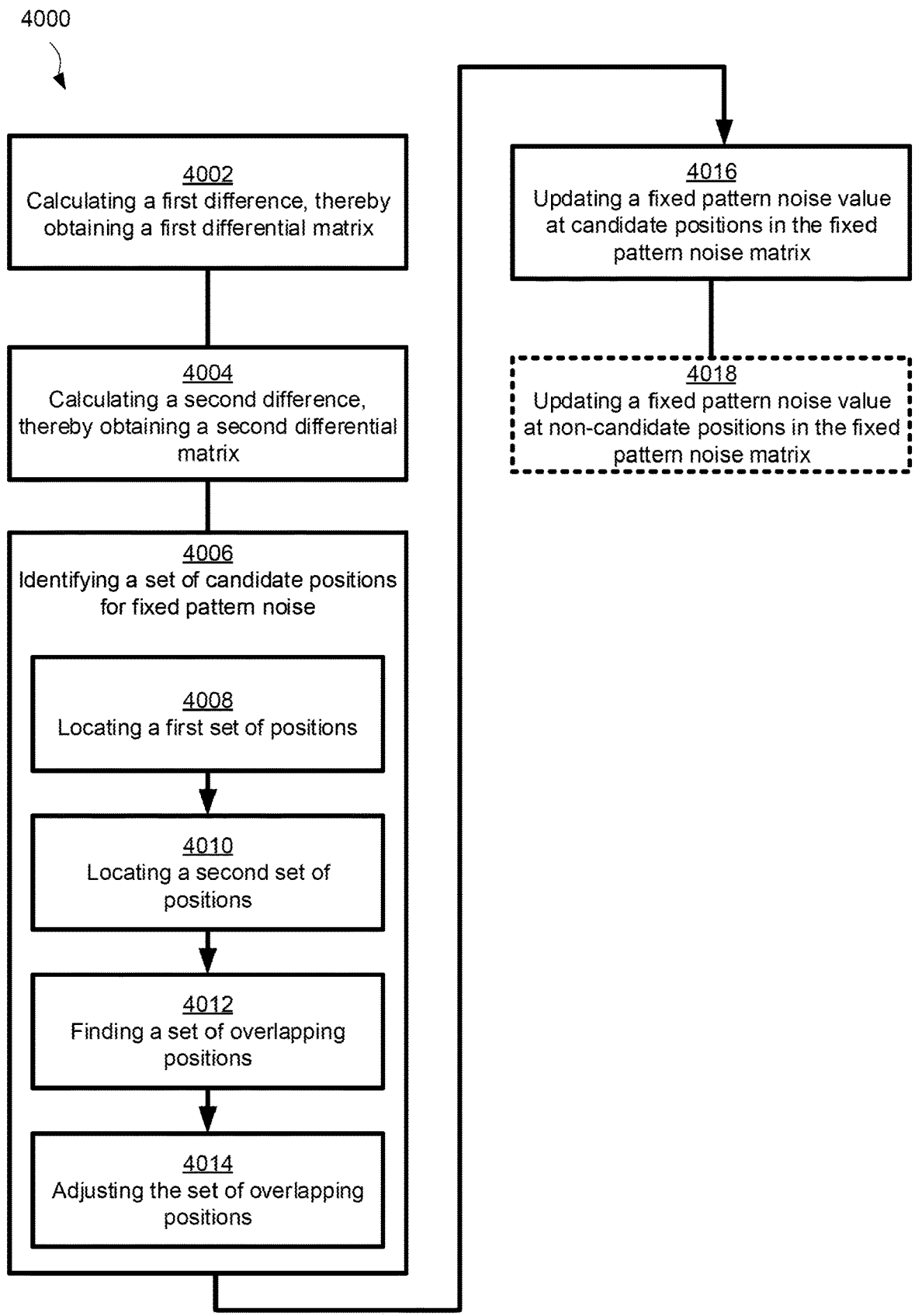
FIG. 4 is a block scheme of a method for updating a fixed pattern noise matrix.

FIG. 4 is a box scheme of a method 4000 for updating a fixed pattern noise matrix.

The method 4000 comprises calculating 4002 a first difference between pixel values of a target image 3100 in an electronic-image stabilized video stream and pixel values of a first different image in the electronic-image stabilized video stream, thereby obtaining a first differential matrix.

The method 4000 further comprises calculating 4004 a second difference between pixel values of the target image 3100 in the electronic-image stabilized video stream and pixel values of a second different image in the electronic-image stabilized video stream, thereby obtaining a second differential matrix.

The method 4000) further comprises identifying 4006 a set of candidate positions for fixed pattern noise in the fixed pattern noise matrix by: locating 4008 a first set of positions in the first differential matrix at which a difference of pixel values deviates from a predetermined value, locating 4010 a second set of positions in the second differential matrix at which a difference of pixel values deviates from the predetermined value, finding 4012 a set of overlapping positions between the first set of positions and the second set of positions, and adjusting 4014 the set of overlapping positions based on stabilization data of the target image 3100, wherein the adjusted set of overlapping positions is used as the set of candidate positions for fixed pattern noise. The stabilization data may be determined by a motion sensor 1104. The motion sensor 1104 may comprise a gyroscope, an accelerometer, and/or a three-axis compass.

The method 4000 further comprises updating 4016, for each position in the set of candidate positions in the fixed pattern noise matrix, a fixed pattern noise value at the position, wherein the updated fixed pattern noise value at each position in the set of candidate positions is based on a value at a corresponding non-adjusted position in the first and/or second differential matrix.

The updated fixed pattern noise value at each candidate position in addition may be based on a present fixed pattern noise value at the candidate position in the fixed pattern noise matrix.

The contribution to the updated fixed pattern noise value from the present fixed pattern noise value may be scaled by a blend factor between 0 and 100%, and the contribution to the updated fixed pattern noise value from the value at the corresponding non-adjusted position in the first and/or second differential matrix may be scaled by a difference between 100% and the blend factor.

The method 4000 may further comprise updating 4018, for each position not being part of the set of candidate positions in the fixed pattern noise matrix, a fixed pattern noise value at the position, wherein the updated fixed pattern noise value at each position not being part of the set of candidate positions is based on a present fixed pattern noise value scaled by the blend factor.

Figure 5:
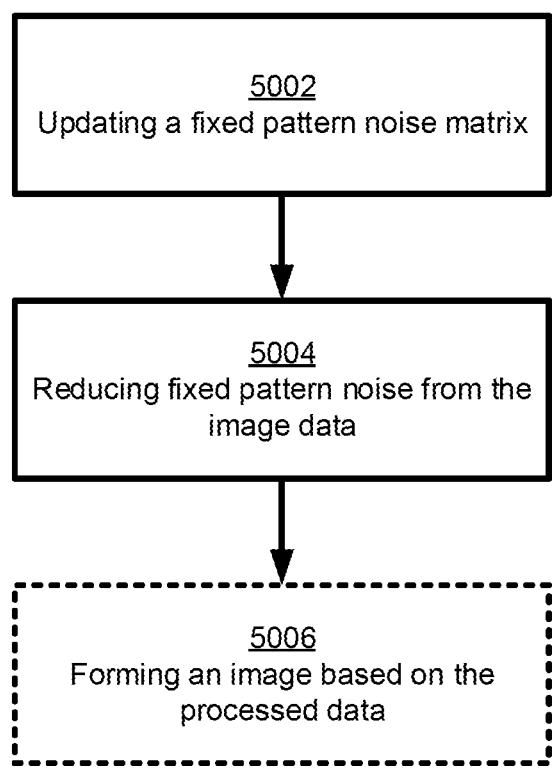
FIG. 5 is a block scheme of a method for processing image data.

FIG. 5 is block scheme of a method 5000 for processing image data. The method 5000 comprises updating 5002 a fixed pattern noise matrix by the method 4000 for updating a fixed pattern noise matrix described in relation to FIG. 4.

The method 5000 for processing image data further comprises reducing 5004 fixed pattern noise from the image data by subtracting the fixed pattern noise values of the fixed pattern noise matrix from pixel values of the image data.

The method 5000 for processing image data may further comprise forming 5006 an image based on the processed image data.

Even though the method 4000 for updating fixed pattern noise matrix and the method 5000 for processing image data is described in a sequential manner, a skilled person realizes that certain steps of the methods 4000, 5000 may be performed in a different order and/or simultaneously with other steps.

The person skilled in the art realizes that the present concept by no means is limited to the preferred variants described above. On the contrary, many modifications and variations are possible within the scope of the appended claims.

For example, the present concept has been described a target image 3100, a first different image 3110, and a second different image 3120. However, it is to be understood that the electronic-image stabilized video stream may comprise further images, and the fixed pattern noise matrix may be updated based on further images. For instance, the method 4000 may comprise calculating a plurality of differences between pixel values in the target image 3100 and pixel values in each of a plurality of further images in the electronic-image stabilized video stream. Thereby, the set of candidate positions for fixed pattern noise in the fixed pattern noise matrix may be identified based on a plurality of differential matrices.

Additionally, variations to the disclosed variants can be understood and effected by the skilled person in practicing the claims, from a study of the drawings, the disclosure, and the appended claims.

The invention claimed is:

1. A method for updating a fixed pattern noise matrix, the method comprising:
    calculating a first difference between pixel values of a target image in an electronic-image stabilized video stream and pixel values of a first different image in the electronic-image stabilized video stream, thereby obtaining a first differential matrix;
    calculating a second difference between pixel values of the target image in the electronic-image stabilized video stream and pixel values of a second different image in the electronic-image stabilized video stream, thereby obtaining a second differential matrix;
    identifying a set of candidate positions for fixed pattern noise in the fixed pattern noise matrix by:
        locating a first set of positions in the first differential matrix at which a difference of pixel values deviates from a predetermined value,
        locating a second set of positions in the second differential matrix at which a difference of pixel values deviates from the predetermined value,
        finding a set of overlapping positions between the first set of positions and the second set of positions, and
        adjusting the set of overlapping positions based on stabilization data of the target image, wherein the adjusted set of overlapping positions is used as the set of candidate positions for fixed pattern noise; and
    updating, for each position in the set of candidate positions in the fixed pattern noise matrix, a fixed pattern noise value at the position, wherein the updating of the fixed pattern noise value at each position in the set of candidate positions is based on a value at a corresponding non-adjusted position in the first and/or second differential matrix.

2. The method according to claim 1, wherein the updating of the fixed pattern noise value at each candidate position, in addition, is based on a present fixed pattern noise value at the candidate position in the fixed pattern noise matrix.

3. The method according to claim 2, wherein the contribution to the updated fixed pattern noise value from the present fixed pattern noise value is scaled by a blend factor between 0 and 100%, and wherein the contribution to the updated fixed pattern noise value from the value at the corresponding non-adjusted position in the first and/or second differential matrix is scaled by a difference between 100% and the blend factor.

4. The method according to claim 1, further comprising:
updating, for each position not being part of the set of candidate positions in the fixed pattern noise matrix, a fixed pattern noise value at the position, wherein the updated fixed pattern noise value at each position not being part of the set of candidate positions is based on a present fixed pattern noise value scaled by a blend factor.

5. A method for processing image data, the method comprising:
updating a fixed pattern noise matrix by the method comprising:
calculating a first difference between pixel values of a target image in an electronic-image stabilized video stream and pixel values of a first different image in the electronic-image stabilized video stream, thereby obtaining a first differential matrix;
calculating a second difference between pixel values of the target image in the electronic-image stabilized video stream and pixel values of a second different image in the electronic-image stabilized video stream, thereby obtaining a second differential matrix;
identifying a set of candidate positions for fixed pattern noise in the fixed pattern noise matrix by:
locating a first set of positions in the first differential matrix at which a difference of pixel values deviates from a predetermined value,
locating a second set of positions in the second differential matrix at which a difference of pixel values deviates from the predetermined value,
finding a set of overlapping positions between the first set of positions and the second set of positions, and
adjusting the set of overlapping positions based on stabilization data of the target image, wherein the adjusted set of overlapping positions is used as the set of candidate positions for fixed pattern noise;
updating, for each position in the set of candidate positions in the fixed pattern noise matrix, a fixed pattern noise value at the position, wherein the updating of the fixed pattern noise value at each position in the set of candidate positions is based on a value at a corresponding non-adjusted position in the first and/or second differential matrix; and
reducing fixed pattern noise from the image data by subtracting the fixed pattern noise values of the fixed pattern noise matrix from pixel values of the image data.

6. The method according to claim 5, the method further comprising:
forming an image based on the processed image data.

7. A non-transitory computer-readable storage medium having stored thereon instructions for implementing a method, when executed on a device having processing capabilities, for updating a fixed pattern noise matrix, the method comprising:
calculating a first difference between pixel values of a target image in an electronic-image stabilized video stream and pixel values of a first different image in the electronic-image stabilized video stream, thereby obtaining a first differential matrix;
calculating a second difference between pixel values of the target image in the electronic-image stabilized video stream and pixel values of a second different image in the electronic-image stabilized video stream, thereby obtaining a second differential matrix;
identifying a set of candidate positions for fixed pattern noise in the fixed pattern noise matrix by:
locating a first set of positions in the first differential matrix at which a difference of pixel values deviates from a predetermined value,
locating a second set of positions in the second differential matrix at which a difference of pixel values deviates from the predetermined value,
finding a set of overlapping positions between the first set of positions and the second set of positions, and
adjusting the set of overlapping positions based on stabilization data of the target image, wherein the adjusted set of overlapping positions is used as the set of candidate positions for fixed pattern noise; and
updating, for each position in the set of candidate positions in the fixed pattern noise matrix, a fixed pattern noise value at the position, wherein the updating of the fixed pattern noise value at each position in the set of candidate positions is based on a value at a corresponding non-adjusted position in the first and/or second differential matrix.

8. A camera comprising:
an image sensor configured to capture a video stream;
a motion sensor; and
a processor configured to:
electronically image stabilize the captured video stream based on data received from the motion sensor, and
update a fixed pattern noise matrix using a method comprising:
calculating a first difference between pixel values of a target image in an electronic-image stabilized video stream and pixel values of a first different image in the electronic-image stabilized video stream, thereby obtaining a first differential matrix;
calculating a second difference between pixel values of the target image in the electronic-image stabilized video stream and pixel values of a second different image in the electronic-image stabilized video stream, thereby obtaining a second differential matrix;
identifying a set of candidate positions for fixed pattern noise in the fixed pattern noise matrix by:
locating a first set of positions in the first differential matrix at which a difference of pixel values deviates from a predetermined value,
locating a second set of positions in the second differential matrix at which a difference of pixel values deviates from the predetermined value,
finding a set of overlapping positions between the first set of positions and the second set of positions, and
adjusting the set of overlapping positions based on stabilization data of the target image, wherein the adjusted set of overlapping positions is used as the set of candidate positions for fixed pattern noise; and
updating, for each position in the set of candidate positions in the fixed pattern noise matrix, a fixed pattern noise value at the position, wherein the updating of the fixed pattern noise value at each position in the set of candidate positions is based on a value at a corresponding non-adjusted position in the first and/or second differential matrix.

9. The camera according to claim 8, wherein the motion sensor comprises a gyroscope, an accelerometer, and/or a three-axis compass.

10. The camera according to claim 8, wherein the processor is further configured to:
   reduce fixed pattern noise from image data associated with the electronically image stabilized video stream by subtracting the fixed pattern noise values of the fixed pattern noise matrix from pixel values of the image data.

11. The camera according to claim 8, wherein the processor is further configured to:
   form a processed image based on the image data having reduced fixed pattern noise.

12. The camera according to claim 8, further comprising:
   a non-transitory computer-readable storage medium configured to store the fixed pattern noise matrix.

13. The camera according to claim 8, wherein the camera is a thermal camera.

* * * * *